US011238362B2

(12) United States Patent
Jin et al.

(10) Patent No.: US 11,238,362 B2
(45) Date of Patent: *Feb. 1, 2022

(54) MODELING SEMANTIC CONCEPTS IN AN EMBEDDING SPACE AS DISTRIBUTIONS

(71) Applicant: Adobe Inc., San Jose, CA (US)

(72) Inventors: Hailin Jin, San Jose, CA (US); Zhou Ren, Los Angeles, CA (US); Zhe Lin, Fremont, CA (US); Chen Fang, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 1419 days.

This patent is subject to a terminal disclaimer.

(21) Appl. No.: 14/996,959

(22) Filed: Jan. 15, 2016

(65) Prior Publication Data

US 2017/0206465 A1 Jul. 20, 2017

(51) Int. Cl.
 *G06N 20/00* (2019.01)
 *G06F 16/58* (2019.01)
 (Continued)

(52) U.S. Cl.
 CPC ......... *G06N 20/00* (2019.01); *G06F 16/5866* (2019.01); *G06F 40/169* (2020.01);
 (Continued)

(58) Field of Classification Search
 CPC ... G06N 20/00; G06F 16/5866; G06F 17/241; G06F 17/2785
 See application file for complete search history.

(56) References Cited

U.S. PATENT DOCUMENTS 7,814,040 B1 * 10/2010 Zhang .................. G06K 9/6278
 706/45
7,890,512 B2 * 2/2011 Mei ........................ G06F 16/58
 707/737
(Continued)

FOREIGN PATENT DOCUMENTS

CN   102119389   12/2013
WO   WO-2011094757   8/2017

OTHER PUBLICATIONS

Liu, et al. "Multi-Task Deep Visual-Semantic Embedding for Video Thumbnail Selection", 2015 IEEE Conference on Conference on Computer Vision and Pattern Recognition (CVPR), Jun. 7-12, 2015 (Year: 2015).*

(Continued)

*Primary Examiner* — Tsu-Chang Lee
(74) *Attorney, Agent, or Firm* — FIG. 1 Patents

(57) ABSTRACT

Modeling semantic concepts in an embedding space as distributions is described. In the embedding space, both images and text labels are represented. The text labels describe semantic concepts that are exhibited in image content. In the embedding space, the semantic concepts described by the text labels are modeled as distributions. By using distributions, each semantic concept is modeled as a continuous cluster which can overlap other clusters that model other semantic concepts. For example, a distribution for the semantic concept "apple" can overlap distributions for the semantic concepts "fruit" and "tree" since can refer to both a fruit and a tree. In contrast to using distributions, conventionally configured visual-semantic embedding spaces represent a semantic concept as a single point. Thus, unlike these conventionally configured embedding spaces, the embedding spaces described herein are generated to (Continued)

model semantic concepts as distributions, such as Gaussian distributions, Gaussian mixtures, and so on.

20 Claims, 8 Drawing Sheets

(51) Int. Cl.
  *G06N 3/04* (2006.01)
  *G06N 3/08* (2006.01)
  *G06F 40/30* (2020.01)
  *G06F 40/169* (2020.01)
(52) U.S. Cl.
  CPC .......... *G06F 40/30* (2020.01); *G06N 3/0454* (2013.01); *G06N 3/08* (2013.01)

(56) References Cited

U.S. PATENT DOCUMENTS

| | | | |
|---|---|---|---|
| 10,026,020 | B2 | 7/2018 | Jin et al. |
| 2006/0120627 | A1* | 6/2006 | Shiiyama ............ G06K 9/00456 382/305 |
| 2011/0191374 | A1* | 8/2011 | Bengio .................. G06F 16/50 707/780 |
| 2013/0121600 | A1* | 5/2013 | Lin ...................... G06K 9/4676 382/224 |
| 2014/0355835 | A1* | 12/2014 | Rodriguez-Serrano ...................... G06K 9/72 382/105 |
| 2017/0011279 | A1 | 1/2017 | Soldevila et al. |
| 2017/0206435 | A1 | 7/2017 | Jin et al. |

OTHER PUBLICATIONS

Liu, et al. "Learning Semantic Visual Vocabularies Using Diffusion Distance", 2009 IEEE Conference on Computer Vision, 2009 (Year: 2009).*
Kiros, et al., "Unifying Visual-Semantic Embeddings with Multimodal Neural Language Models", NIPS 2014, Deep Learning Worship, 2014 (Year: 2014).*
Tang, et al, "An Image Based Feature Space and Mapping for Linking Regions and Words", 2nd International Conference on Computer Vision Theory and Applications, Barcelona, Spain, Mar. 8-11, 2007 (Year: 2007).*
Krähenbühl, et al., et al. "Geodesic Object Proposals", European Conference on Computer Vision, ECCV 2014, pp. 725-739 (Year: 2014).*
Weston et al., "Large scale image annotation: learning to rank with join word-image embeddings", Machine Learning (2010) 81:21-35 (Year: 010).*
Fu, et al., "Learning Semantic Hierarchies: A Continuous Vector Space Approach", IEEE/ACM Transactions on Audio, Speech, and Language Processing, vol. 23, No. 3, Mar. 2015 (Year: 2015).*

"Notice of Allowance", U.S. Appl. No. 14/997,011, dated Mar. 19, 2018, 11 pages.
Frome,"DeViSE: A Deep Visual-Semantic Embedding Model", In Neural Information Processing Systems, 2013, 11 pages.
Gong,"Deep Convolutional Ranking for Multilabel Image Annotation", In International Conference on Learning Representations, 2014, 9 pages.
Krahenbuhl,"Geodesic Object Proposals", In European Conference on Computer Vision, 2014, 15 pages.
Norouzi,"Zero-Shot Learning by Convex Combination of Semantic Embeddings", In International Conference on Learning Representations, 2014, 9 pages.
"Combined Search and Examination Report", GB Application No. 1619343.5, dated Apr. 28, 2017, 5 pages.
"Combined Search and Examination Report", GB Application No. 1619341.9, dated Apr. 28, 2017, 7 pages.
"First Action Interview Office Action", U.S. Appl. No. 14/997,011, dated Jun. 12, 2017, 3 pages.
"Pre-Interview Communication", U.S. Appl. No. 14/997,011, dated May 4, 2017, 3 pages.
Karpathy,"Deep Visual-Semantic Alignments for Generating Image Descriptions", Department of Computer Science, Stanford University Proceedings of the IEEE Conference on Computer Vision and Pattern Recognition, 2015, 17 pages.
Krähenbühl,"Geodesic Object Proposals", European Conference on Computer Vision. Springer International Publishing, 2014, 24 pages.
Norouzi,"Zero-Shot Learning by Convex Combination of Semantic Embeddings", arXiv preprint arXiv: 1312.5650, 2013, 9 pages.
Pennington,"GloVe: Global Vectors for Word Representation", EMNLP vol. 14, 2014, 12 pages.
Wang,"CNN-RNN: A Unified Framework for Multi-Label Image Classification", 2016 IEEE Conference on Computer Vision and Pattern Recognition (CVPR), Jun. 27, 2016.
Wang,"Learning Deep Structure-Preserving Image-Text Embeddings", arXiv preprint arXiv: 1511.06078, Nov. 19, 2015, 9 pages.
Weston,"Large Scale Image Annotation: Learning to Rank with Joint Word-Image Embeddings", Machine Learning, vol. 81, Jul. 27, 2010, 16 pages.
"Final Office Action", U.S. Appl. No. 14/997,011, dated Nov. 2, 2017, 30 pages.
Ren,"Faster R-CNN: Towards Real-Time Object Detection with Region Proposal Networks", arXiv preprint arXiv:1506.01497v2, Sep. 13, 2015, 10 pages.
"Foreign Office Action", GB Application No. 1619343.5, dated Jul. 22, 2019, 3 pages.
"Foreign Office Action", CN Application No. 201610995187.2, dated Jul. 19, 2021, 16 pages.
"Foreign Office Action", AU Application No. 2016259337, dated Jan. 30, 2021, 4 pages.
"Foreign Notice of Acceptance", AU Application No. 2016259337, dated Aug. 31, 2021, 4 pages.

\* cited by examiner

MODELING SEMANTIC CONCEPTS IN AN EMBEDDING SPACE AS DISTRIBUTIONS

BACKGROUND

Image classification is a fundamental problem in computer vision. Broadly speaking, image classification attempts to extract semantic information from an image so that the image can be labeled to describe the content of the image. Semantic information can include, for instance, objects depicted in an image (and locations of the image at which the objects are depicted), scenes depicted in an image (e.g., whether the image depicts a beach or a sunset), moods associated with human faces or facial expressions depicted in an image, image aesthetics (e.g., good composition, poor composition, obeys the rule-of-thirds, and so on), image sentiment (e.g., fear, anger, and the like), and so forth.

Some conventional image classification techniques utilize visual-semantic embedding spaces in which both text labels that describe semantic concepts and images that exemplify the semantic concepts are embedded. Visual-semantic embedding spaces created according to conventional techniques typically represent semantic concepts that are described by text labels as single points in the embedding space. Due to the complex relationships between semantic concepts and the variety of meaning a single semantic concept can convey, however, representing semantic concepts as single points in an embedding space may not reflect the manner in which they are understood in the real world. Conventionally configured visual-semantic embedding spaces may thus inaccurately represent semantic concepts. Since these inaccuracies may be carried over when used to label images, such embedding spaces may be unsuitable for accurately labeling images with text labels to describe their content.

SUMMARY

Modeling semantic concepts in an embedding space as distributions is described. In the embedding space, both images and text labels are represented. The text labels describe semantic concepts that are exhibited in image content. In the embedding space, the semantic concepts described by the text labels are modeled as distributions. By using distributions, each semantic concept is modeled in the embedding space as a continuous cluster which can overlap other clusters that model other semantic concepts. For example, a distribution for the semantic concept "apple" can overlap distributions for the semantic concepts "fruit" and "tree" since apple can refer to both a fruit and a tree. In contrast to using distributions, conventionally configured visual-semantic embedding spaces represent a semantic concept as a single point. Thus, unlike these conventionally configured embedding spaces, the embedding spaces described herein are generated to model semantic concepts as distributions (e.g., Gaussian distributions, Gaussian mixtures, etc.), resulting in a more accurate representation of semantic concepts, a greater ability to annotate images with text labels that more accurately describe their depicted content, and so on.

Once an embedding space is trained, the embedding space can be used to discover text labels to describe content of an image. To use a trained embedding space to discover text labels that describe content of an image, multiple semantically meaningful regions of the image can be determined, and corresponding text labels can be discovered in the trained embedding space for each of the regions. The text labels discovered for the multiple regions of the image can then be associated with the image, e.g., used to annotate the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
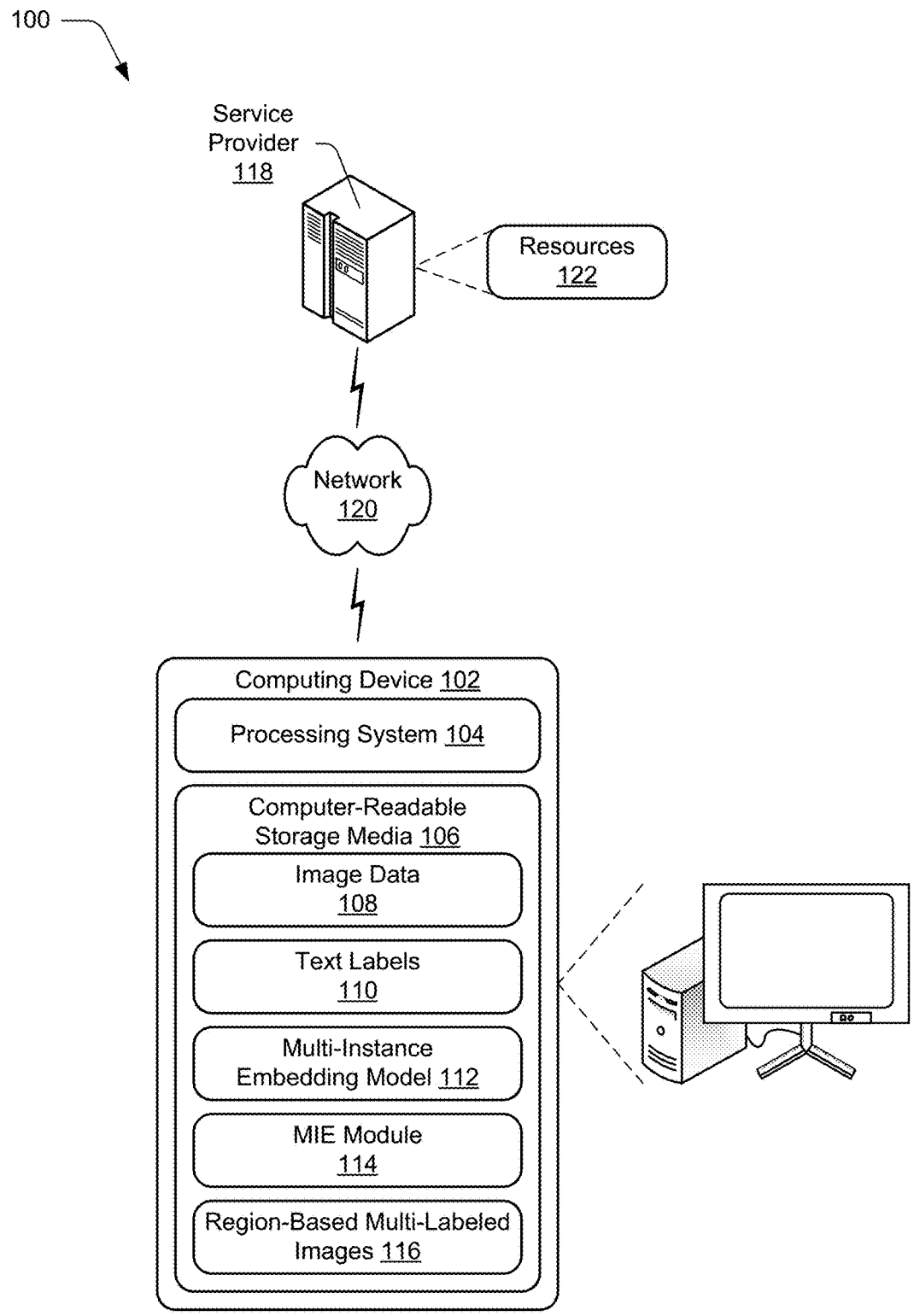
FIG. 1 is an illustration of a digital environment in an example implementation that is operable to employ techniques described herein.

Conventional visual-semantic embedding techniques leverage semantic information from unannotated text data to learn semantic relationships between text labels and explicitly map images into a rich semantic embedding space. However, conventionally configured visual-semantic embedding spaces typically represent semantic concepts as single points in the embedding space. Due to the complex relationships between semantic concepts and the variety of meaning a single semantic concept can convey, however, representing semantic concepts as single points may not reflect the manner in which they are understood in the real world. Consequently, conventionally configured visual-semantic embedding spaces may inaccurately represent semantic concepts. Further, these inaccuracies may be carried over when such embedding spaces are used to label images. As such, conventionally configured visual-semantic embedding spaces may be unsuitable for accurately labeling images with text labels to describe their content.

Modeling semantic concepts in an embedding space as distributions is described. In particular, an embedding space is generated in which both images and text labels are represented. In contrast to conventional techniques, generation of the embedding space involves modeling semantic concepts described by text labels of a text vocabulary as distributions, such as Gaussian distributions, Gaussian mixtures, and the like. Consider the semantic concepts described by the words "tree", "apple", and "fruit". There is at least some overlap between the semantic concepts because an apple is a fruit, and is also a type of tree. Representing such semantic concepts as distributions rather than single points allows the semantic concepts to overlap, such that the distribution for the semantic concept of apple overlaps the distributions for the semantic concepts of both tree and fruit.

The embedding space is configured as a joint image-text embedding space in which both text labels and representative images (e.g., regions of images) are represented. In the embedding space, the distributions model semantic concepts that can be exhibited in images and are described by text labels of a text vocabulary. In modeling the semantic concepts as distributions, the semantic relationships between these text labels is also considered. In other words, the semantic concepts are modeled so that distributions representing semantic concepts like "sun" and "sunset" are more closely related than the distributions that represent the semantic concepts "sun" and "bird".

The embedding space, once trained as described herein, can be used to annotate images with text labels. Consider an example in which an image not yet associated with text labels is received as input for annotation. Label discovery techniques can be applied to the input image to discover text labels from the trained embedding space to describe the content of the input image. To do so, semantically meaningful regions of the input image are proposed, e.g., using geodesic object proposal. The term "geodesic object proposal" refers to a technique in which a set of candidate objects in a given image are identified according to critical level sets in geodesic distance transforms computed for seeds placed in the image. To place the seeds, geodesic object proposal uses trained classifiers that are optimized to discover objects. Once proposed, the semantically-meaningful regions proposed for the input image are then compared to the image regions that are embedded in the embedding space relative to the semantic concepts modeled as distributions, e.g., by comparing vectors indicative of visual characteristics of the embedded image regions and the proposed regions of the input image. Based on the comparison, the proposed regions of the image can be mapped to visually similar embedded image regions, and thus also to the text labels that describe the semantic concepts to which the similar embedded image regions correspond. The input image can then be annotated with the text labels discovered in this process.

The visual-semantic embedding spaces described herein (e.g., that represent semantic concepts described by text labels as distributions) more accurately represent semantic concepts and the relationships between them than conventionally configured visual-semantic embedding spaces which represent semantic concepts as single points. Further, the techniques described herein enable a joint image-text embedding space to be trained using training images having multiple text labels, and enable an image to be annotated with multiple text labels using the joint image-text embedding space. The techniques described herein also enable semantically meaningful regions to be discovered for each of multiple text labels associated with an image. In addition, the techniques described herein provide an advantage in zero shot learning over conventional techniques, e.g., to classify images in new categories not previously described by the text labels of the embedding space.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that includes one or more processing devices (e.g., processors) and one or more computer-readable storage media 106. The illustrated environment 100 also includes image data 108, text labels 110, multi-instance embedding model 112, multi-instance embedding module 114 ("MIE module 114"), and region-based multi-labeled images 116, which are embodied on the computer-readable storage media 106 and operable via the processing system 104 to implement corresponding functionality described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 118, configured to communicate with computing device 102 over a network 120, such as the Internet, to provide a "cloud-based" computing environment. Generally speaking, service providers 118 are configured to make various resources 122 available over the network 120 to clients. In some scenarios, users sign up for accounts that are employed to access corresponding resources from a provider. The provider authenticates credentials of a user (e.g., username and password) before granting access to an account and corresponding resources 122. Other resources 122 are made freely available, (e.g., without authentication or account-based access). The resources 122 can include any suitable combination of services and/or content typically made available over a network by one or more providers. Some examples of services include, but are not limited to, image storage and/or sharing services (e.g., Flickr®), social network services (e.g., Facebook®, Twitter®, Instagram®, Hyperlapse®, and the like), search engine services capable of returning images as search results, and so forth.

These services serve as sources of significant amounts of image data. Image data 108 represents such image data, which may be formatted in any of a variety of image formats, including but not limited to JPEG, TIFF, RAW, GIF, BMP, PNG, and so on. The image data made available through the services may be posted by users that have accounts with those services. For example, a user having an account with an image storage and/or sharing service uploads images, such as those taken with a digital camera of the user, or those sent to the user via electronic means. A user of the image storage and/or sharing service may then share their uploaded images with others, such as by providing a link to albums of images or to a profile of the user.

In addition, the images are capable of being associated with additional information to describe the images. For example, the images represented by the image data 108 can include metadata that describes the images. By way of example, the metadata of an image can describe a pixelwise size of the image, a storage size of the image, a camera device used to capture the image, a date the image was captured, a date the image was last modified, and so on. In addition, the images represented by the image data 108 can be associated with metadata that describes the content depicted in the images. For instance, the metadata can be configured as text labels, and the images can be annotated with those text labels that describe their content. Such text labels can describe objects depicted in an image (and locations of the image at which the objects are depicted), scenes depicted in an image (e.g., whether the image depicts a beach or a sunset), moods associated with human faces or facial expressions depicted in an image, image aesthetics (e.g., good composition, poor composition, obeys the rule-of-thirds, and so on), image sentiment (e.g., fear, anger, and the like), and so forth. Broadly speaking, the text labels 110 represent a variety of text labels with which images can be annotated.

The MIE module 114 represents functionality to implement techniques for modeling semantic concepts in an embedding space as distributions as described herein. As part of doing so, the MIE module 114 creates an embedding space that is configured as a joint image-text embedding space. By "joint image-text embedding space" it is meant that both the text labels 110 and representative images (e.g., regions of images) from the image data 108 can be embedded therein. The multi-instance embedding model 112 is representative of such an embedding space. Further, the MIE module 114 represents functionality to train the multi-instance embedding model 112 so that, given an image region, the multi-instance embedding model 112 can be used to discover a text label that describes the content depicted in the image region.

To train the multi-instance embedding model 112, the MIE module 114 semantically relates the text labels embedded in the multi-instance embedding model 112 according to the semantic concepts described by the text labels. For example, the MIE module 114 semantically relates the text labels so that the text labels "sun" and "sunset" are more closely positioned in the multi-instance embedding model 112 than the text labels "sun" and "bird".

The MIE module 114 also trains the multi-instance embedding model 112 using training images, which can be included as part of image data 108. The training images are each, before the training, already associated with multiple text labels that describe the content depicted. For each training image, the MIE module 114 processes the image to generate a set of regions of the image that correspond to the training image's multiple text labels. Thus, the MIE module 114 forms a region-to-label correspondence for each training image, such that a region of the training image is selected to represent each of the multiple text labels. The MIE module 114 then embeds the set of regions into the multi-instance embedding model 112. In particular, the MIE module 114 embeds a region into the multi-instance embedding model 112 based on a position where the region's corresponding label is embedded. For example, when a training image is associated with the text label "sun", a region of the training image corresponding to "sun" is selected. The MIE module 114 then embeds the region of the training image that corresponds to "sun" based, at least in part, on a position in the multi-instance embedding model 112 where the text label "sun" is embedded. The MIE module 114 can perform this process for each training image in a set of training images.

In one or more implementations, the multi-instance embedding model 112 is configured to model the semantic concepts described by the text labels and depicted by representative images as distributions, e.g., Gaussian distributions, Gaussian Mixtures, and so on. This contrasts with techniques which represent semantic concepts as single points. Embedding images that are associated with multiple text labels to single points in a visual-semantic embedding space can cause visual-semantic embedding functions to be easily confused, e.g., causing the techniques to be less accurate in predicting the content depicted in an image.

In addition, the MIE module 114 represents functionality to annotate images. By "annotate" it is meant that text labels which describe the content depicted in an image can be chosen and associated with the image. To annotate an image, the MIE module 114 proposes a set of regions of the image. In particular, the MIE module 114 extracts regions from the image that are semantically meaningful, e.g., using geodesic object proposal since it covers both foreground and background regions. The MIE module 114 then applies one or more label discovery techniques to the set of regions to discover labels for the regions. This involves comparing each region to the representative images embedded in the multi-instance embedding model 112. The MIE module 114 can then determine which of the images embedded in the multi-instance embedding model 112 are similar to a region to be annotated, and associate the text label that corresponds to similar embedded images with the region to be annotated.

In this way, an image can be initially associated with a large number of text labels, e.g., one for each of the proposed regions. The number of text labels can be reduced, however, so that an image is annotated with the labels that are determined to be most representative of the image content. For example, the MIE module 114 can annotate an image with a predetermined number of text labels. In this scenario, the MIE module 114 selects the predetermined number of text labels for which the regions of the image are most similar to images embedded in the multi-instance embedding model 112. Alternately, the MIE module 114 selects a variable number of text labels for images that are to be annotated. In this alternate scenario, the number of text labels selected can be based on a threshold similarity, such that with any regions of the image for which the similarity with an embedded image is above the threshold similarity, the discovered text label is used to annotate the image. In any case, the region-based multi-labeled images 116 represent images that the MIE module 114 annotates with multiple text labels by determining image regions and using the multi-instance embedding model 112 to discover labels for the image regions.

In one or more implementations, the MIE module 114 is implementable as a software module, a hardware device, or using a combination of software, hardware, firmware, fixed logic circuitry, etc. Further, the MIE module 114 can be implementable as a standalone component of the computing device 102 as illustrated. In addition or alternatively, the MIE module 114 can be configured as a component of a web service, an application, an operating system of the computing device 102, a plug-in module, or other device application as further described in relation to FIG. 8.

Having considered an example environment, consider now a discussion of some example details of the techniques for modeling semantic concepts in an embedding space as distributions in accordance with one or more implementations.

Modeling Semantic Concepts in an Embedding Space as Distributions

This section describes some example details of techniques for modeling semantic concepts in an embedding space as distributions in accordance with one or more implementations. The discussion refers to FIG. 2, which illustrates an image with multiple text labels and which illustrates concepts pertinent to the functionality described herein.

Figure 2:
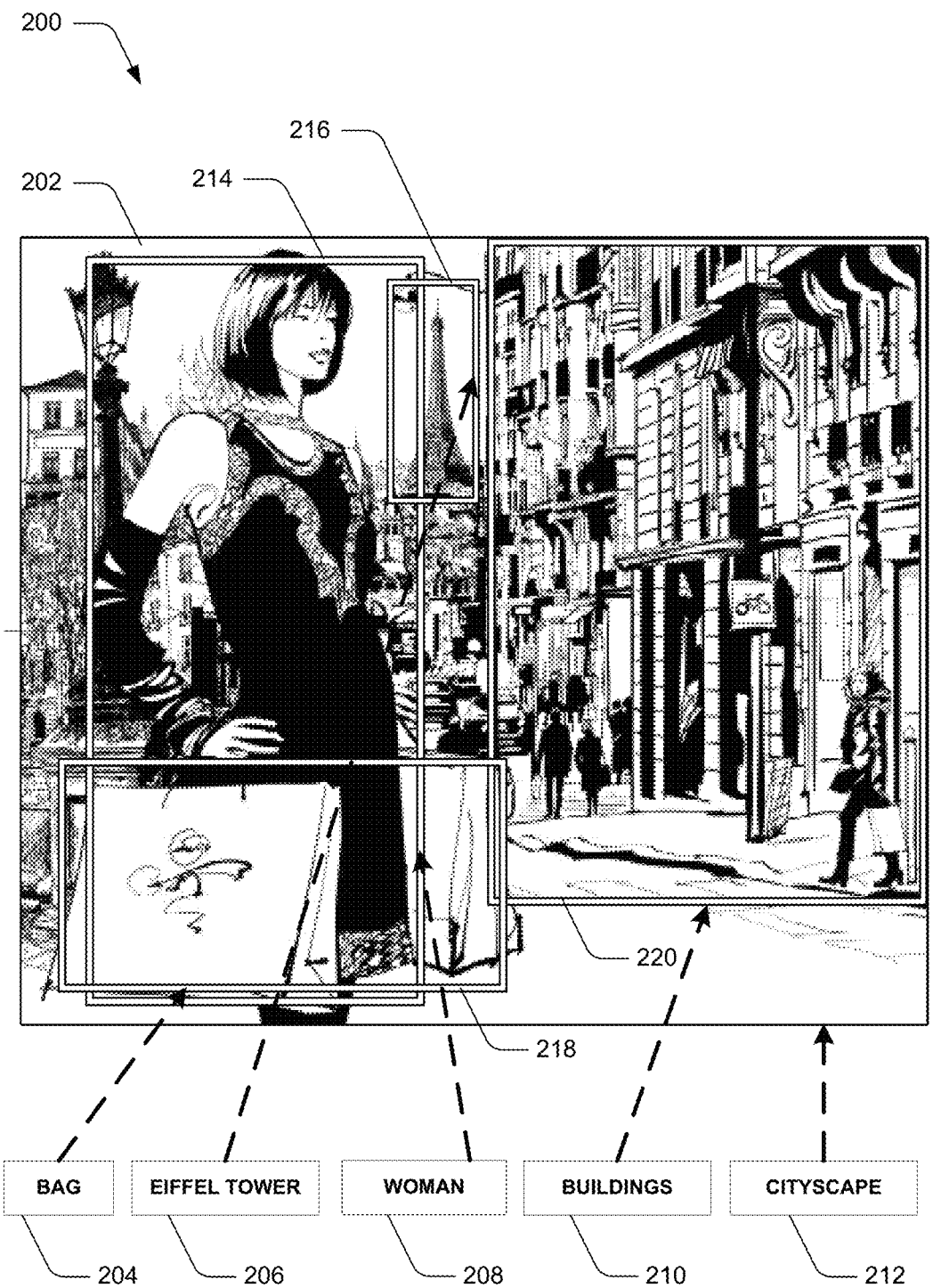
FIG. 2 is an example implementation depicting an image with multiple text labels and indications of regions of the image that correspond to the multiple text labels.

In particular, FIG. 2 depicts generally at 200 an image 202 with text labels 204, 206, 208, 210, 212. FIG. 2 also depicts image regions 214, 216, 218, 220. The image 202 can represent a training image that is already associated with the text labels 204, 206, 208, 210, 212 and for which the MIE module 114 selects the image regions 214, 216, 218, 220 to correspond to the text labels, e.g., the image region 214 to correspond to the text label 208, the image region 216 to correspond to the text label 206, the image region 218 to correspond to the text label 204, the image region 220 to correspond to the text label 210, and an image region representative of the entirety of the image 202 to correspond to the text label 212. Alternately, the image 202 can represent an image that is annotated by the MIE module 114, such that the MIE module 114 generates proposed regions for the image 202, discovers text labels for the proposed regions using the multi-instance embedding model 112, and selects the text labels 204, 206, 208, 210, 212 that correspond to the image regions 214, 216, 218, 220 (as well as a region corresponding to an entirety of the image) from the discovered text labels for describing the content of the image 202.

Figure 3:
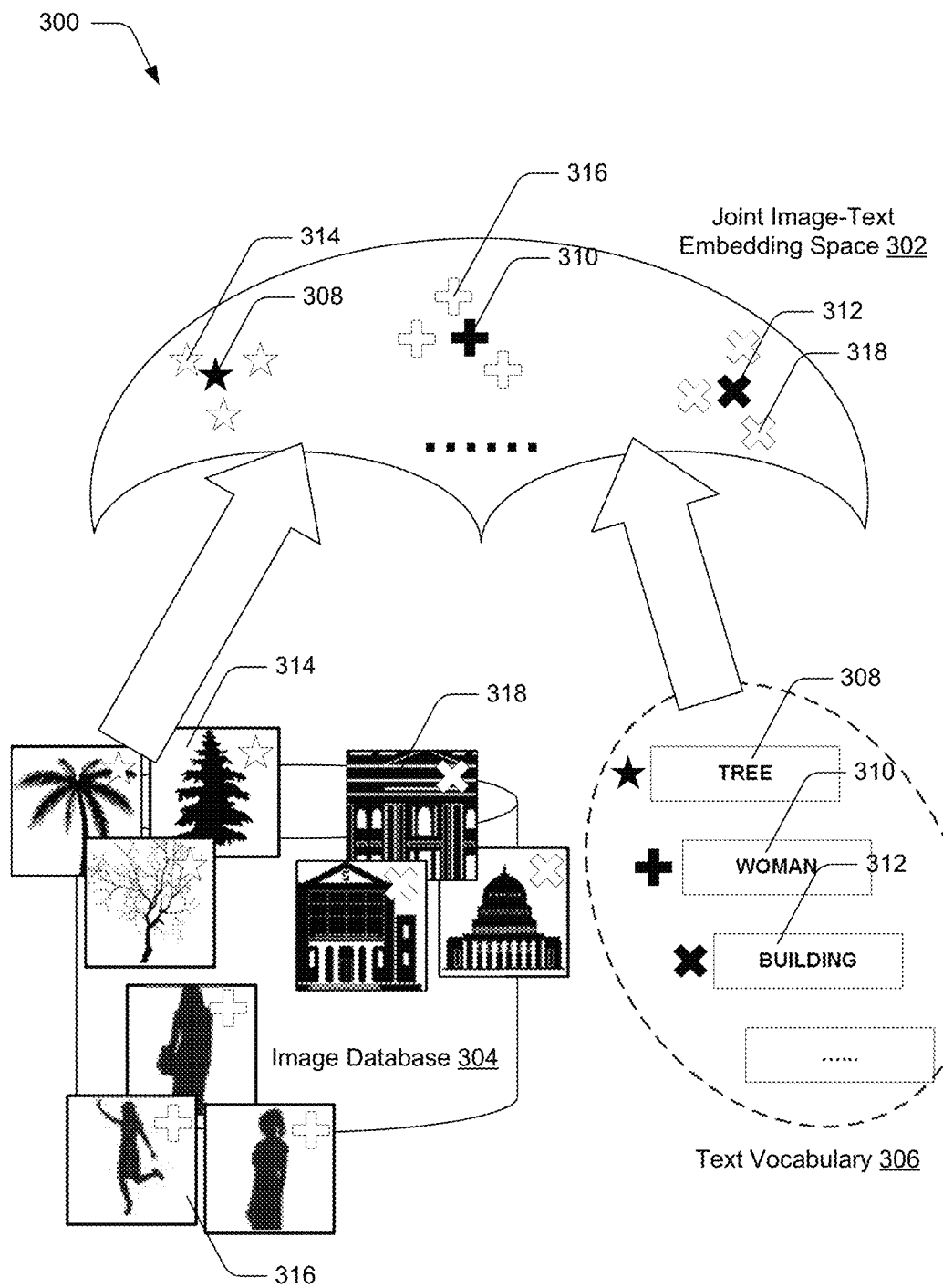
FIG. 3 is an example implementation of an embedding space that is configured to embed both text labels and image regions that are mapped to the text labels.

FIG. 3 depicts generally at 300 an example embedding space in which both text labels and image regions that are mapped to the text labels can be embedded. In particular, FIG. 3 includes joint image-text embedding space 302 (which can correspond to the multi-instance embedding model 112 of FIG. 1), image database 304 (which includes images used by the MIE module 114 to train the joint image-text embedding space 302), and text vocabulary 306 (which can correspond to the text labels 110 of FIG. 1 that are usable to describe semantic concepts depicted in images).

The joint image-text embedding space 302 is configured to have both text labels and images (entire images and portions of images) embedded therein. The image database 304 and the text vocabulary 306 represent the images and the text labels, respectively, that the MIE module 114 uses to train the joint image-text embedding space 302, e.g., so that the joint image-text embedding space 302 can be used to discover text labels that describe content of an image. The text labels that make up the text vocabulary 306 are configured to describe semantic concepts which can be exhibited in image content. The images of the image database 304 depict image content which exemplifies the semantic concepts described by the text labels of the text vocabulary 306.

In training, the MIE module 114 semantically relates the text labels within the text vocabulary 306. Take text label 308 for "tree", for example. The MIE module 114 represents functionality to semantically relate the text label 308 for "tree" to text label 310 for "woman" and text label 312 for "building", e.g., by embedding the text labels 308, 310, 312 at positions in the joint image-text embedding space 302. The positions at which the text labels are embedded in the joint image-text embedding space 302 depends on how closely the sematic concepts described by the text labels are related. By way of example, the text label 308 for "tree" may be embedded in the joint image-text embedding space 302 so that it is positioned closer to text labels for "pine tree", "forest", and "plants" (not shown) than to the text label 310 for "woman" and the text label 312 for "building".

In FIG. 3, each of the text labels 308, 310, 312 is illustrated next to a filled-in shape that signifies the respective text label, e.g., the text label 308 for "tree" is illustrated next to a filled-in star, the text label 310 for "woman" is illustrated next to a filled-in cross, and the text label 312 for "building" is illustrated next to a filled-in X. Each of these filled-in shapes is also included in the joint image-text embedding space 302 to represent the embedding of the text labels 308, 310, 312. It should be appreciated that the depicted shape of the joint image-text embedding space 302 and the depicted positions of the filled-in shapes may not accurately reflect an actual form of the joint image-text embedding space 302 or the positions at which the MIE module 114 actually embeds the text labels 308, 310, 312. Rather, the depicted shape of the joint image-text embedding space 302 and the depicted positions of the filled-in shapes are useful for explaining the techniques described herein.

The MIE module 114 also relates the images in the image database 304 to the text labels of the text vocabulary 306. As mentioned above, the training images of the image database 304 can depict image content which exemplifies the semantic concepts described by the text labels of the text vocabulary 306. To relate the images to the text labels, the MIE module 114 embeds each image at a position in the joint image-text embedding space 302 based, in part, on a position of the corresponding text label. In other words, the MIE module 114 maps each image to the text label that describes the image content of the image, and embeds the image based on a position of that text label.

For example, the images of the image database 304 that depict a tree are embedded in the joint image-text embedding space 302 based on a position at which the text label 308 for "tree" is embedded, e.g., the MIE module 114 maps the images that depict trees to the text label 308 for "tree". In a similar manner, images that depict a woman are embedded based on a position at which the text label 310 for "woman" is embedded, and images that depict a building are embedded based on a position at which the text label 312 for "building" is embedded. In other words, an image is embedded in the joint image-text embedding space 302 at a position that is closer to a text label to which the image corresponds than to other text labels. An image is also embedded in the joint image-text embedding space 302 closer to images that correspond to closely-related sematic concepts than to images corresponding to less closely-related semantic concepts. By way of example, an image of a tree is generally embedded in the joint image-text embedding space 302 closer to images of pine trees and forests than to images of buildings or images of women.

In FIG. 3, image set 314 represents the images of the image database 304 that depict a tree, image set 316 represents the images of the image database 304 that depict a woman, and image set 318 represents the images of the image database 304 that depict a building. The images of each image set 314, 316, 318 are illustrated with unfilled shapes that signify the images, e.g., the images of the image set 314 (which depict trees) are illustrated with unfilled stars, the images of the image set 316 (which depict women) are illustrated with unfilled crosses, and the images of the image set 318 (which depict buildings) are illustrated with unfilled X's.

These unfilled shapes are also included in the joint image-text embedding space 302 to represent the embedding of the images from the image sets 314, 316, 318, the positions of which are based on where the corresponding text labels 308, 310, 312 are embedded. Consequently, the unfilled stars which represent the images depicting trees are illustrated around the filled-in star that represents the text label 308 for "tree", the unfilled crosses which represent the images depicting women are illustrated around the filled-in cross that represents the text label 310 for "woman", and the unfilled X's which represent the images depicting buildings are illustrated around the filled-in X that represents the text label 312 for "building".

With regard to the representative images embedded in the joint image-text embedding space 302, the MIE module 114 extracts them from training images as regions. Thus, the set of images 314 that depict women can correspond to regions (e.g., portions of images less than an entirety) that are extracted from training images. Broadly speaking, to train the joint image-text embedding space 302, the MIE module 114 starts with training images that are each associated with multiple text labels. By way of example, the MIE module 114 starts with training images, such as the image 202 which is already associated with the text labels 204, 206, 208, 210, 212.

For each training image, the MIE module 114 generates a set of regions that correspond to the text labels of the training image. Consider the example of FIG. 2, in which the image 202 is associated with the text labels 204, 206, 208, 210, 212. In this example, the MIE module 114 can generate a region that corresponds to each of the text labels 204, 206, 208, 210, 212, such that the image region 214 corresponds to the text label 208 for "woman", the image region 216 corresponds to the text label 206 for "Eiffel Tower", the image region 218 corresponds to the text label 204 for "bag", the image region 220 corresponds to the text label 210 for "buildings", and the image region representative of the entirety of the image 202 corresponds to the text label 212 for "cityscape".

To generate the regions that correspond a training image's text labels, the MIE module 114 initially applies a region proposal technique to the training image. For example, the MIE module 114 applies at least one of a geodesic object proposal technique, a random region proposal technique, and so forth. Semantically meaningful regions of an image do not merely include objects depicted in a foreground of the image. Indeed, background portions of an image can also be semantically meaningful. In contrast to general object proposal techniques, the region proposal techniques used by the MIE module 114 cover both foreground and background regions of images to propose image regions.

Once a set of candidate regions is proposed for a training image, the MIE module 114 discards at least some of the proposed candidate regions. The number of candidate regions initially proposed by the object proposal techniques the MIE module 114 uses can be thousands, and using each of the proposed candidate regions for training would significantly burden computing resources. Accordingly, the MIE module 114 can apply one or more post processing techniques to discard at least some of the proposed candidate regions. For instance, the MIE module 114 can apply one or more post processing techniques to discard proposed candidate regions that fail to meet predefined size criteria or aspect ratio criteria. By way of example and not limitation, a predefined size criterion may specify that in order to use a proposed candidate region, the proposed candidate region's sides are to be at least thirty percent as long as a corresponding side of the image, e.g., for an image that is 400 pixels by 500 pixels, the MIE module 114 enforces the criterion by discarding any proposed candidate region having a size less than 120 pixels by 150 pixels. With regard to an example aspect ratio, a predefined aspect ratio criterion may specify that in order to use a proposed candidate region, the proposed candidate region's aspect ratio is to be between 1:4 and 4:1.

From the remaining proposed candidate regions, the MIE module 114 then assigns a best-matching candidate region to each text label of the training image jointly to build a region-to-label correspondence. In so doing, the MIE module 114 is configured to use a single-label embedding model. This has the effect of discarding an even greater number of the proposed candidate regions so that the number of remaining regions corresponds to the number of text labels associated with the image. The MIE module 114 then embeds these regions into the joint image-text embedding space 302. With reference to the example in FIG. 2 and in the scenario in which the image 202 is used to train the joint image-text embedding space 302, the MIE module can reduce thousands of candidate regions proposed by the region proposal techniques to the image regions 214, 216, 218, 220, as well as a region corresponding to an entirety of the image 202.

To embed the regions of the training images in the joint image-text embedding space 302, the MIE module 114 computes d-dimensional feature vectors for the regions. The MIE module 114 can compute the feature vectors for the regions, for instance, by extracting image features with a Convolutional Neural Network (CNN), e.g., one that includes convolution, pooling, and inception layers. In one particular example, the MIE module 114 extracts the image features with a Fast Region-based CNN (RCNN) technique. Said another way, given a training image and the regions that are to be embedded in the joint image-text embedding space 302, the MIE module 114 passes the training image through the CNN a single time. The MIE module 114 can then pool each region of the generated set of regions into a fixed-size feature map to obtain a final feature vector.

Consider an example in which the MIE module 114 trains the joint image-text embedding space 302 using a set of training images, each of which is associated with multiple text labels. Such a set of training images may be defined as $D \equiv \{(x_i, y_1)\}_{i=1}^{N}$, where $x_i$ represents the i-th image in the set and the N represents the number of training images in the set. Further, each image can be represented by d-dimensional feature vector $\mathbb{R}^d$ which can be computed as discussed above, such that for the i-th image of the set $x_i \in \mathbb{R}^d$. Further, each training image is associated with a set of text labels, such that for the i-th image $x_i$ the set of text labels $y_1$ is defined as $(y_i^1, \ldots, y_i^t)$, where t represent the number of text labels associated with the i-th image. It should be noted that this definition for the set of text labels allows a number of labels associated with the training images to vary from image to image.

For the sake of simplicity, the set of training images to be embedded can be denoted as $X \stackrel{\text{def}}{=} \mathbb{R}^d$. Conventional techniques formulate the classification or annotation problem for images associated with multiple text labels as a multi-class classification. In contrast to the techniques described herein, this conventional formulation predefines a fixed set of class labels such as $y_i^1 \in Y \equiv \{1, \ldots, m\}$, learns an m-way classifier or m one-against-all classifiers, and uses the learned classifier or classifiers to classify the set of training images X into the fixed set of class labels Y such that $(X \rightarrow Y)$. The scalability of such conventional techniques is limited with regard to a number of labels, however, because conventional techniques retrain the models they utilize when new labels emerge.

Rather than defining text labels as a discrete set like these conventional techniques do, visual-semantic models learn a continuous semantic space S, which captures semantic relationships among text labels and explicitly learns a mapping function $(X \rightarrow S)$ from the set of training images X to the continuous semantic space S. Thus, the MIE module 114 is configured to construct an image-label training data pair $\{(x_i, s(y_i))\}$ to learn an embedding function $f: X \rightarrow S$ for the joint image-text embedding space 302. The MIE module 114 learns the embedding function in order to map the i-th image $x_i$ of the set of training images to the joint image-text embedding space 302. The MIE module 114 learns this as a function $s(y_i)$ of the set of text labels $y_1$ that are associated with the i-th image $x_i$. The function $s(y_i)$ is learned so that a set of labels Y that are used is mapped to the continuous semantic space S such that $s: Y \rightarrow S$.

In one or more implementations, the MIE module 114 is configured to learn the continuous semantic label space S (e.g., the relationships between the text labels) using a text modeling architecture technique that is trained with unannotated text data, e.g., unannotated text data from the Internet. The text modeling architecture enables the MIE module 114 to learn similar embedding positions for semantically related text labels since synonyms are more likely to appear in similar semantic contexts. By way of example, the MIE module 114 uses a Glove model to construct a 300-dimension text label space S, which embodies the semantic relationships among text labels.

With regard to learning embedding functions, some conventional visual-semantic approaches learn the embedding function $f: X \rightarrow S$ for an embedding space with an $L_2$ loss function or ranking loss function. Generally, such functions encourage a projected embedding point for a given image to be closer to its corresponding label in the embedding space. The following is an example of such a ranking loss function used by conventional visual semantic approaches, specifically it corresponds to a pairwise hinge-ranking loss function:

$$l_{rank}(x_i, y_i) = \sum_{j \in \tau_+} \sum_{k \in \tau_-} \max(0, m + D_{f(x_i), y_j} - D_{f(x_i), y_k})$$

Here, the term $f(\cdot)$ represents an embedding function to be learned, the term m represents a margin. For simplicity of notation, y is used instead of $s(y)$ to denote the label vector in the continuous semantic label space S. Further, $\tau_+$ denotes a set of positive text labels, $\tau_-$ denotes a set of negative text labels, $\{y_j\}_{j \in \tau_+}$ denotes positive label vectors, and $\{y_k\}_{K \in \tau_-}$ denotes negative label vectors. The term $D_{f(x_i), y_i}$ indicates a distance between an embedding vector $f(x_i)$ for the i-th image $x_i$ and a vector $y_i$ for the image's labels.

Conventional visual-semantic approaches which use the pairwise hinge-ranking function noted above have drawbacks, however. For example, although each image $x_i$ may correspond to multiple labels in set of text labels $y_i$, one or more pairs of those labels may be embedded in positions that are relatively far away from one another in the continuous semantic label space S. Thus, pushing the embedding of an entire image $f(x_i)$ so that the i-th image $x_i$ is embedded at a position in the embedding space close to the multiple text labels (that are embedded at positions relatively far away from one another) can cause errors with the embedding function. In addition or alternately, doing so can result in mapping the image $x_i$ to an average position of the label vectors, such that the average position corresponds to a different semantic concept than the concepts described by the individual text labels.

In contrast to conventional visual-semantic embedding techniques, the MIE module 114 is configured to use the following loss function in one or more implementations to learn multi-instance embedding for the joint image-text embedding space 302:

$$l_{MIE}(x_i, y_i) = \sum_{j \in \tau_+} \sum_{k \in \tau_-} \max\left(0, m + \min_{c \in C} D_{f(x_i^c), y_j} - \min_{c \in C} D_{f(x_i^c), y_k}\right)$$

Here, the term $x_i^c$ represents a particular region c of the i-th image $x_i$, e.g., a region that was generated in the manner described above to correspond to one of the text labels associated with the i-th image $x_i$. The term C represents the set of regions generated for the i-th image $x_i$. Further, $\{y_j\}_{j \in \tau_+}$ denotes the positive label vectors, $\{y_k\}_{k \in \tau_-}$ denotes the negative label vectors, and $D_{f(x_i^c), y_j}$ indicates a distance between the embedding of the image region $f(x_i^c)$ and the corresponding text label $y_j$ for which that image region is generated. In one or more implementations, the MIE module 114 computes the distance as a squared Euclidean distance. Further and as shown in the loss equation to learn the multi-instance embedding, the MIE module 114 can model region-to-label correspondences through application of a minimum operation (e.g., the min term) on the distances from a label to each region of the set of regions. In so doing, the MIE module 114 selects at least one region of a training image to explain the semantic concept described by each text label of the training image. Additionally, the MIE module 114 is more likely to select the region for a text label that has a closest embedded position in the embedding space to the text label.

In one or more implementations, the MIE module 114 optimizes a ranking of the predicted text labels for the regions of a training image. To do so, the MIE module 114 uses an adjusted multi-instance embedding loss formula that encourages positive text labels (e.g., those associated with the training image) to have smaller min-distances than most negative text labels. In this way, the MIE module 114 ranks the positive text labels at a top of a list of predicted text labels for a given region of a training image. In other words, the MIE module 114 penalizes false predictions that rank positive text labels at a bottom of the list. By way of example, the MIE module 114 may be configured to optimize the ranking of the predicted text labels according to the following adjusted formula:

$$\widetilde{l_{MIE}}(x_i, y_i) = \sum_{j \in \tau_+} \sum_{k \in \tau_-} w(r_j) \cdot \max\left(0, m + \min_{c \in C} D_{f(x_i^c), y_i} - \min_{c \in C} D_{f(x_i^c), y_j}\right)$$

Here the term w(•) is a weight function, and the term $r_j$ is a rank of a positive text label in a list of predicted text labels for a given region of a training image. In one or more implementations, the MIE module 114 determines the term $r_j$ according to the following:

$$r_j = \sum_{t \neq j} \mathbb{1}\left(\min_{c \in C} D_{f(x_i^c), y_t} \leq \min_{c \in C} D_{f(x_i^c), y_k}\right)$$

Here $\mathbb{1}(\bullet)$ is an indicator function, which the MIE module 114 uses for the i-th image $x_i$ to rank a predicted text label $y_t$ according to its distance (e.g., in the joint image-text embedding space 302) to each region in the set of regions C. In particular, the MIE module 114 computes the ranking as a function of the minimum distance to each region, which is represented by the term $\min_{c \in C} D_{f(x_i^c), y_t}$. Further, the MIE module 114 can be configured to use a weight function defined as follows:

$$w(r) = \begin{cases} 1 & \text{if } r < \#(\tau_+), \\ r & \text{otherwise} \end{cases}$$

Here, the term $\#(\tau_+)$ represents a number of text labels associated with the i-th image $x_i$. Thus, if one of the text labels associated with the i-th image $x_i$ is one of the top-$\#(\tau_+)$ text labels in the prediction list, then the MIE module 114 penalizes the loss by assigning a smaller number to the weight. For example, if the i-th image $x_i$ is associated with five text labels and one of the associated text labels is one of the top-five ranked labels in the list of text labels predicted for the image, then the MIE module 114 penalizes the computed loss by assigning a smaller number to the weight. In contrast, if one of the labels associated with the i-th image $x_i$ is not one of the top-$\#(\tau_+)$ text labels in the prediction list, then the MIE module 114 penalizes the loss by assigning a larger number to the weight.

Continuing with the example in which the i-th image $x_i$ is associated with five text labels, consider a scenario in which one of the associated text labels is not one of the top-five ranked labels in the list of text labels predicted for the image. In this case, the MIE module 114 penalizes the computed loss by assigning a larger number to the weight. By applying a penalty to the loss function in this way, the MIE module 114 maps semantically meaningful regions closer to their corresponding labels in the joint image-text embedding space 302. After the regions of the training images (e.g., those included in image database 304) are mapped to the text labels (e.g., those included in the text vocabulary 306) in the joint image-text embedding space 302, it can be used by the MIE module 114 to find text labels for unannotated images.

Consider an example in which the MIE module 114 is given an image to annotate x', e.g., in conjunction with indexing images for search. In a similar manner as regions are generated for the training images, the MIE module 114 generates a set of regions C' for the image-to-be-annotated x', e.g., the MIE module 114 applies a region proposal technique (e.g., geodesic object proposal or random region proposal) to the image-to-be-annotated, then applies post processing techniques to the proposed regions to reduce the number of proposed regions for the image-to-be-annotated.

The MIE module 114 then passes the image-to-be-annotated and the set of regions generated therefrom through the joint image-text embedding space 302 to obtain embedding vectors for each of the regions. Given the embedding function discussed above, the MIE module 114 computes embedding vectors for set of regions of the image-to-be-annotated such that an embedding vector $f(x'^c)$ is obtained for a given region c. Then for any of the text labels y' in the joint image-text embedding space 302, the MIE module 114 computes a distance between the image-to-be-annotated x' and positions of the text labels y' in the joint image-text embedding space 302 by $\min_{c \in C'} D_{f(x'^c), y'}$. Thus, the MIE module 114 determines, for each region of the image-to-be-annotated, a text label to which the region is closest in the joint image-text embedding space 302, e.g., based on a distance between the embedding vector determined for the region and a position of the text label in the joint image-text embedding space 302.

The MIE module 114 then ranks the text labels that are determined for the image-to-be-annotated. In particular, the MIE module 114 ranks the determined text labels according to the distances between the embedding vectors of the regions and the respective text labels, such that text labels for which the distance to the respective region is lesser are ranked more favorably. Accordingly, the determined text label for which the distance to the respective region is the least is the top ranked text label. Using the ranking, the MIE module 114 generates a ranked list of text labels that are determined to correspond to the regions of the image-to-be-annotated. The MIE module 114 can then annotate the image-to-be-annotated with a predetermined number of labels from the list. By way of example and not limitation, the MIE module 114 can annotate the image-to-be-annotated with the top-five ranked text labels from the list of text labels that correspond to the regions. Regardless of the predetermined number, the MIE module 114 is configured to use the joint image-text embedding space 302 to annotate images with multiple text labels.

As described briefly above, the joint image-text embedding space 302 is also configured to model semantic concepts, which are described by the text labels and to which the representative images are mapped, as distributions, e.g., Gaussian distributions, Gaussian mixtures, and so on.

Figure 4:
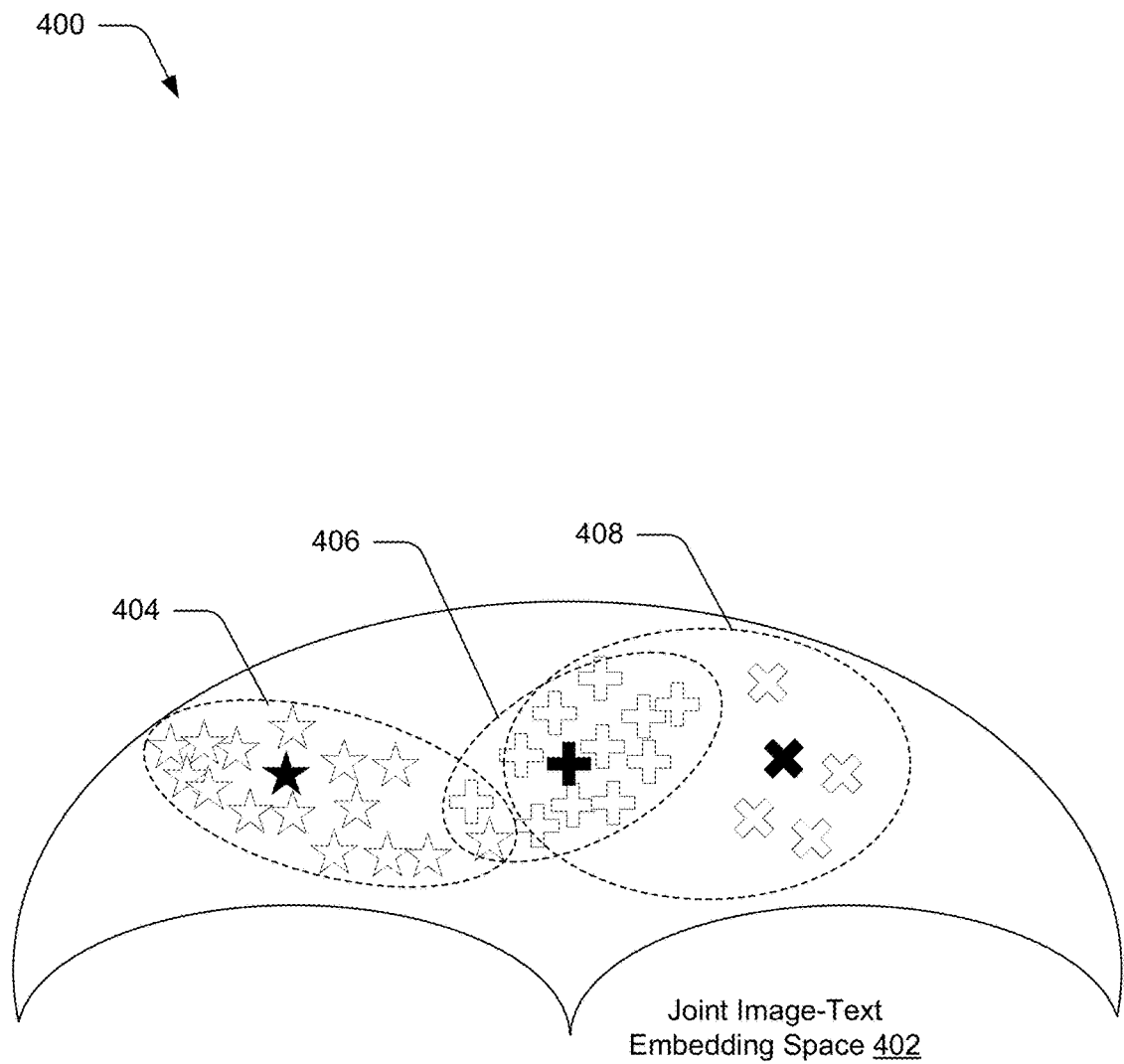
FIG. 4 is another example implementation of the embedding space in which the semantic concepts described by the text labels are modeled as distributions in the embedding space.

FIG. 4 depicts at 400 an example of an embedding space that represents semantic concepts described by text labels as distributions. In particular, the example 400 depicts joint image-text embedding space 402 that includes distributions 404, 406, 408. The distributions 404, 406, 408 may, for instance, represent the semantic concepts of tree, apple, and fruit, respectively. It should be noted that there is some overlap between the distributions 404, 406, 408, which represents that the semantic concepts represented by the text labels can overlap. In other words, the semantic concepts represented by text labels for "tree", "apple", and "fruit" can overlap, in part because, an apple can correspond to a tree, and can also correspond to a fruit. Accordingly, semantic concepts are modeled as distributions in the joint image-text embedding space 402 rather than as single points.

The MIE module 114 learns the joint image-text embedding space 402 to generate it by modeling each semantic concept described by the text labels. By way of example, the MIE module 114 models each of the semantic concepts as a Gaussian distribution as follows:

$$t_k \sim N(\mu_k, \Sigma_k), \forall k \in (1, \ldots, M)$$

Here, the term M represents a number of text labels in a text vocabulary used to train the joint image-text embedding space 402. The term $t_k$ represents the k-th text label t in the text vocabulary, the term $\mu_k$ represents a vector of the k-th text label t (e.g., a Glove feature of the text label that is obtained from a Glove model for text label representation), the term $\Sigma_k$ represents an identity matrix that is initialized to the joint image-text embedding space 402, and N(•) represents a distribution modeling function (e.g., standard Gaussian distribution although other distributions can be used). In one or more implementations, the MIE module 114 learns the distributions for the joint image-text embedding space 402 by deep neural network. The MIE module 114 can represent a given image I in a set of training images by Convolution Neural Network (CNN), and can initialize an image embedding weight for the image according to a loss function, e.g., a ranking loss. With regard to the term the term $\Sigma_k$, the MIE module 114 learns it by minimizing a loss for each image I in the set of training images as follows:

$$\mathrm{loss}(I) = \sum_{\substack{n=1 \\ n \neq i}}^{M} \max(0, m + (I - \mu_i)^T \mu_i^{-1}(I - \mu_i) - (I - \mu_n)^T \mu_n^{-1}(I - \mu_n))$$

With reference to this equation, the MIE module 114 is configured to model the positive text labels $t_i$ for a given image I as $N(\mu_i, \Sigma_i)$, and model the negative text labels $t_n$ for the given image as $N(\mu_n, \Sigma_n)$. As in the equations above, m represents a margin term.

Although implementations of modeling semantic concepts as distributions in an embedding space are described with reference primarily to Gaussian distributions, it should be appreciated that the MIE module 114 is configured to model the semantic concepts described by the text labels in an embedding space using a variety of other distributions without departing from the spirit or scope of the techniques described herein. By way of example and not limitation, the MIE module 114 is also capable of modeling the semantic concepts described by text labels in an embedding space as Gaussian mixtures, Log-normal distributions, Pareto distributions, and so on.

By modeling the semantic concepts described by text labels as distributions rather than single points, the techniques described herein enable the semantic concepts to overlap. This results in the generation of an embedding space that more accurately represents the relationships between semantic concepts than do embedding spaces that model semantic concepts as single points, e.g., because many semantic concepts overlap. For example, the semantic concepts of sun and sunset overlap, but so do the semantic concepts of sun and sunrise. In any case, the MIE module 114 is configured to generate embedding spaces that model the semantic concepts described by text labels of a text vocabulary as distributions.

Having discussed example details of the techniques for modeling semantic concepts in an embedding space as distributions, consider now some example procedures to illustrate additional aspects of the techniques.

Example Procedures

This section describes example procedures for modeling semantic concepts in an embedding space as distributions in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 that makes use of an MIE module 114.

Figure 5:
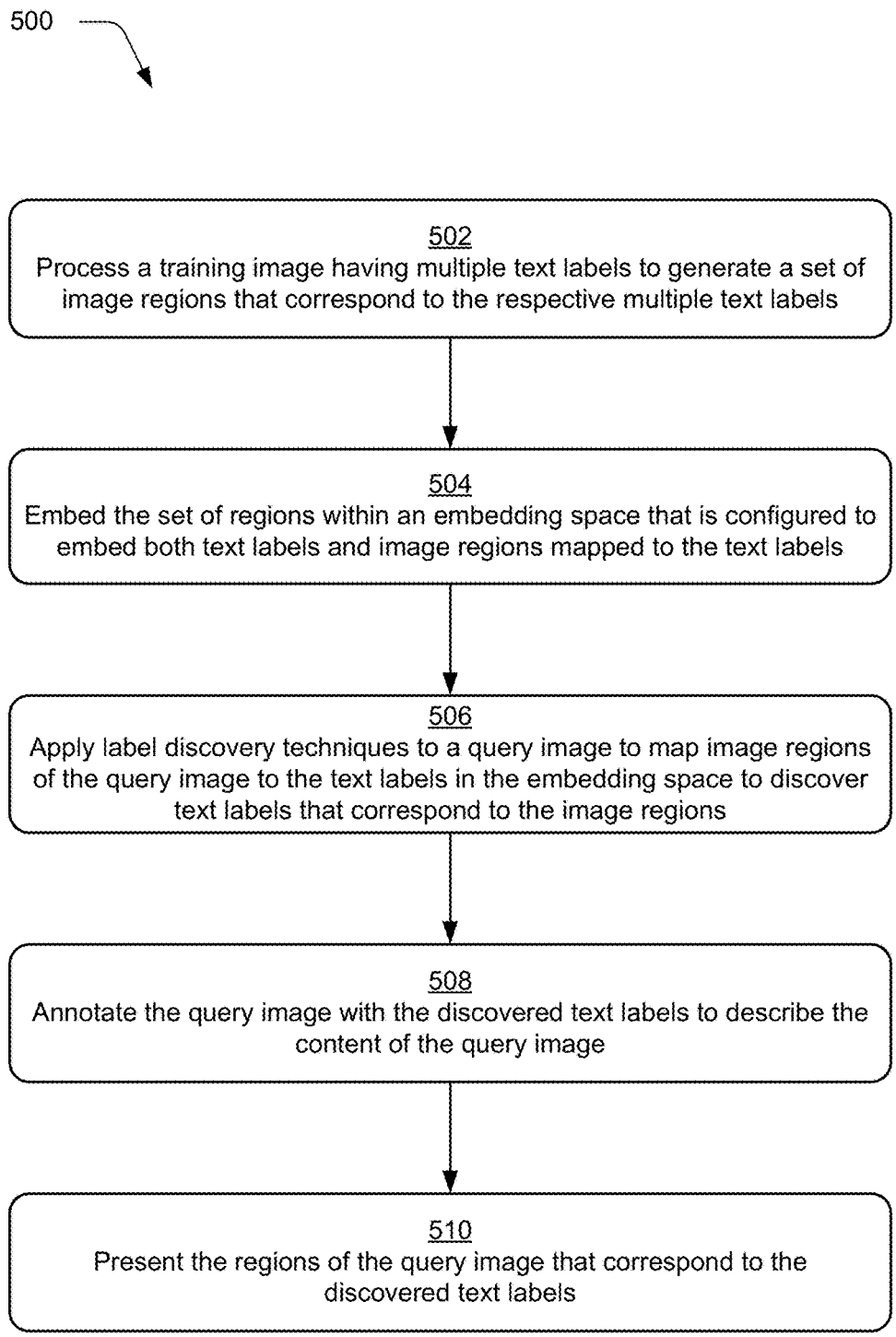
FIG. 5 is a flow diagram depicting a procedure in an example implementation in which regions of a training image associated with multiple text labels are mapped to the corresponding text labels in an embedding space, and in which label discovery techniques are applied to a query image to discover text labels in the embedding space that correspond to regions of the query image.

FIG. 5 depicts an example procedure 500 in which regions of a training image associated with multiple text labels are mapped to the corresponding text labels in an embedding space to train the embedding space, and in which label discovery techniques are applied to a query image to discover text labels in the embedding space that correspond to regions of the query image. A training image associated with multiple text labels is processed to generate a set of image regions that correspond to the respective multiple text labels (block 502).

For example, assume that the image 202 corresponds to a training image and is already associated with the text labels 204, 206, 208, 210, 212. In this scenario, the MIE module 114 processes the image 202 to generate the image regions 214, 216, 218, 220 to correspond to the text labels, such that the image region 214 is generated to correspond to the text label 208, the image region 216 is generated to correspond to the text label 206, the image region 218 is generated to correspond to the text label 204, the image region 220 is generated to correspond to the text label 210, and the image region representative of the entirety of the image 202 is generated to correspond to the text label 212. As discussed in greater detail above, the MIE module 114 generates the image regions by applying a region proposal technique and performing post processing techniques on the proposed candidate regions. The MIE module 114 also generates the corresponding regions by selecting a best-matching region for each of the text labels 204, 206, 208, 210, 212, e.g., based on a distance between positions at which the regions would be embedded in the embedding space and a position of the text label in the embedding space.

The set of regions is embedded within an embedding space configured to embed both text labels and image regions mapped to the text labels (block 504). Further, the set of regions is embedded based, at least in part, on positions at which the multiple text labels that correspond to the image regions of the training image are embedded in the embedding space. By way of example, the MIE module 114 embeds the image regions 214, 216, 218, 220, and the image region that corresponds to the entirety of the image 202 in the joint image-text embedding space 302. The MIE module 114 does so based, at least in part, on positions at which the text labels 204, 206, 208, 210, 212 are embedded in the joint image-text embedding space 302.

As discussed in more detail above, the MIE module 114 computes feature vectors for each of the image regions 214, 216, 218, 220, and the image region that corresponds to the entirety of the image 202, to embed them in the joint image-text embedding space 302, e.g., by extracting image features with a Convolutional Neural Network (CNN) such as a Fast Region-based CNN (RCNN) technique. Additionally, when the MIE module 114 embeds the image regions 214, 216, 218, 220, and the image region that corresponds to the entirety of the image 202 in the joint image-text embedding space 302, the MIE module 114 maps the regions to the corresponding text labels to learn an embedding function, e.g., so that images and image regions without text labels can be mapped to a position in the joint image-text embedding space 302.

Once the embedding space is trained, it is usable to discover text labels for images, e.g., for image tagging, for multiple-texts based image search (to identify images as corresponding to searches), image captioning, and so on. Label discovery techniques are applied to a query image to map image regions of the query image to the text labels embedded in the embedding space to discover text labels that correspond to the image regions (block 506).

Assume now that the image 202 corresponds to the query image and that the text labels 204, 206, 208, 210, 212 have not yet been associated with the image 202. In this scenario, at least one label discovery technique is applied to the image 202 to map the image regions 214, 216, 218, 220, and the image region that corresponds to the entirety of the image 202 to text labels in the joint image-text embedding space 302.

The label discovery technique applied may involve performing a comparison of the image regions 214, 216, 218, 220, and the image region that corresponds to the entirety of the image 202 with image regions embedded in the joint image-text embedding space 302. In one or more implementations, the comparison is performed by comparing feature vectors extracted for the image regions 214, 216, 218, 220, and the image region that corresponds to the entirety of the image 202 to feature vectors of the image regions embedded in the joint image-text embedding space 302 as part of training. Based on the comparison, the MIE module 114 determines the embedded regions that are similar to the image regions 214, 216, 218, 220, and the image region that corresponds to the entirety of the image 202. The MIE module 114 assigns the image regions 214, 216, 218, 220, and the image region that corresponds to the entirety of the image 202 the embedded text labels to which the similar embedded image regions are mapped. In this fashion, the MIE module 114 discovers the text labels 204, 206, 208, 210, 212 in the joint image-text embedding space 302 for the image regions 214, 216, 218, 220, and the image region that corresponds to the entirety of the image 202.

The query image is annotated with the discovered text labels to describe the content of the query image (block 508). By way of example, the MIE module 114 annotates the image 202 with the text labels 204, 206, 208, 210, 212, e.g., by including them with the image 202 as metadata or associating them with the image 202 in some other manner.

The regions of the query image that correspond to the text labels are presented (block 510). By way of example, a user request is received to present the regions of the image 202 that correspond to the text labels with which the image 202 is annotated. The MIE module 114 presents indications (e.g., bounding boxes) of one or more of the image regions 214, 216, 218, 220, and the image region that corresponds to the entirety of the image 202, such as over a display of the image 202. It should be appreciated that the MIE module 114 is capable of presenting indications of the image regions in a variety of different ways without departing from the spirit or scope of the techniques described herein. By way of example and not limitation, indications of the image regions can be presented along with corresponding text labels, a region can be changed visually to appear different from other portions of the image (e.g., in focus while the other portions of the image are made blurry), and so on.

Figure 6:
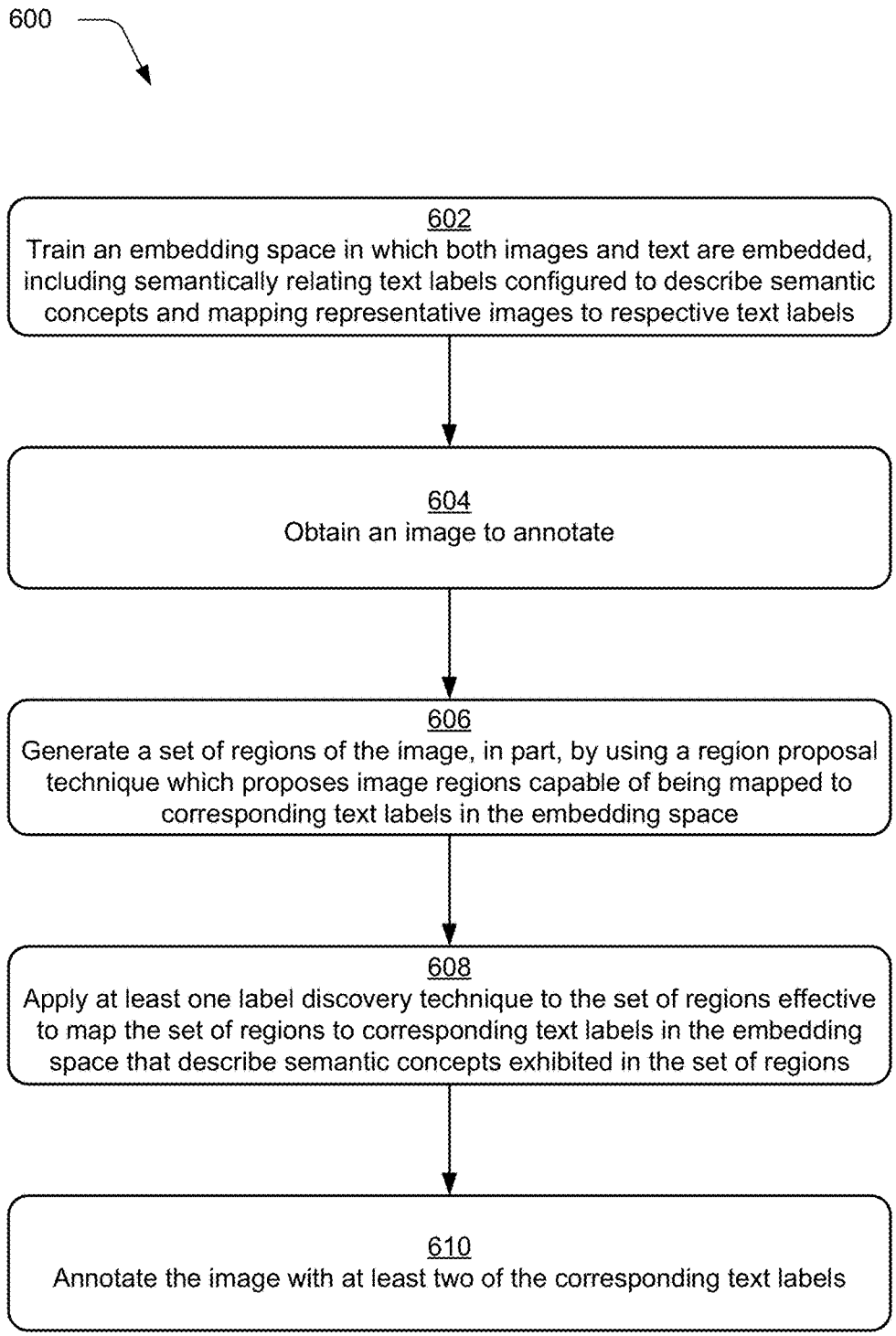
FIG. 6 is a flow diagram depicting a procedure in another example implementation in which a trained embedding space is used to associate multiple text labels with respective regions of an image to be annotated.

FIG. 6 depicts an example procedure 600 in which a trained embedding space is used to associate multiple text labels with respective regions of an image to be annotated. An embedding space is trained in which both images and text are embedded (block 602). The training involves semantically relating text labels configured to describe semantic concepts exhibited in image content and mapping representative images that have image content which exemplifies the semantic concepts to respective text labels.

By way of example, the MIE module 114 trains the joint image-text embedding space 302. To do so, the MIE module 114 semantically relates the text labels of the text vocabulary 306, e.g., by leveraging textual data available on the Internet to learn scalable and lexically distributed representations of words to capture semantic meaning among the text labels of the text vocabulary 306. In one or more implementations, the MIE module 114 leverages one or more text modeling architecture techniques to do so, such as the word2vec model, the Glove model, and so on. Continuing with this example, the MIE module 114 trains the joint image-text embedding space 302 by mapping the representative images of the image database 304 to the respective text labels of the text vocabulary 306 in the joint image-text embedding space 302. For instance, the MIE module 114 maps in the joint image-text embedding space 302 the images of the image set 314 to the text label 308 for "tree", the images of the image set 316 to the text label 310 for "woman", and the images of the image set 318 to the text label 312 for "building".

Once the joint image-text embedding space 302 is trained, it can be used to annotate images. An image to annotate is obtained (block 604). By way of example, the image 202 is obtained. Assume in this example, that the image 202 is unannotated and is not yet associated with the text labels 204, 206, 208, 210, 212.

A set of regions of the image is generated (block 606). In one or more implementations, the generation involves using a region proposal technique which proposes regions that are capable of being mapped to corresponding text labels in the embedding space. By way of example, the MIE module 114 generates a set of regions for the image 202, which includes the image regions 214, 216, 218, 220, and the image region that corresponds to the entirety of the image 202. The MIE module 114 generates the set of regions for the image 202 in the manner described in more detail above. The regions generated are semantically meaningful and capable of being mapped to an embedded text label in the embedding space.

At least one label discovery technique is applied to the set of regions to map the set of regions to corresponding text labels in the embedding space that describe semantic concepts exhibited in the set of regions (block 608). By way of example, the MIE module 114 applies a label discovery technique to the set of regions generated for the image 202 at block 606. In particular, the MIE module 114 maps the set of regions to the text labels embedded in the joint image-text embedding space 302 that describe the semantic concepts exhibited in each of the image regions 214, 216, 218, 220, and the image region that corresponds to the entirety of the image 202. In particular, the MIE module 114 maps the image region 214 which depicts a woman to the text label 208 for "woman", the image region 216 which depicts the Eiffel Tower to the text label 206 for "Eiffel Tower", the image region 218 which depicts shopping bags to the text label 204 for "bag", the image region 220 which depicts buildings to the text label 210 for "buildings", and the image region that corresponds to the entirety of the image 202 to the text label 212 for "cityscape".

The image is annotated with at least two of the corresponding text labels (block 610). For example, the MIE module 114 annotates the image 202 with the text labels 204, 206, 208, 210, 212, based on the mapping at block 608. As noted above, a greater number of image regions than those depicted in FIG. 2 may be generated and mapped into the joint image-text embedding space 302. As a result, a list of text labels that correspond to the image 202 can be generated. However, the image 202 may be annotated with a selected group of text labels from the list. By way of example and not limitation, the list of text labels can be ranked as described in more detail above, and the MIE module 114 selects a predetermined number of top-ranked labels for annotation of the image 202.

In addition to using a ranked list, the labels selected for annotating an image may be chosen in other ways. For instance, the labels may be chosen based on a threshold difference of the corresponding region to representative images embedded in the joint image-text embedding space 302. To do so, the MIE module 114 may find a distance (e.g., Euclidean distance) between each region generated for an image and embedded representative images in the joint image-text embedding space 302, e.g., by extracting feature vectors of the image regions and the embedded representative images and comparing the feature vectors. The MIE module 114 can then select text labels for which the image region had a difference with embedded representative images that is less than a threshold difference. The MIE module 114 can select text labels to annotate an image from the text labels determined to correspond to regions of the image in yet other ways without departing from the spirit or scope of the techniques described herein.

Figure 7:
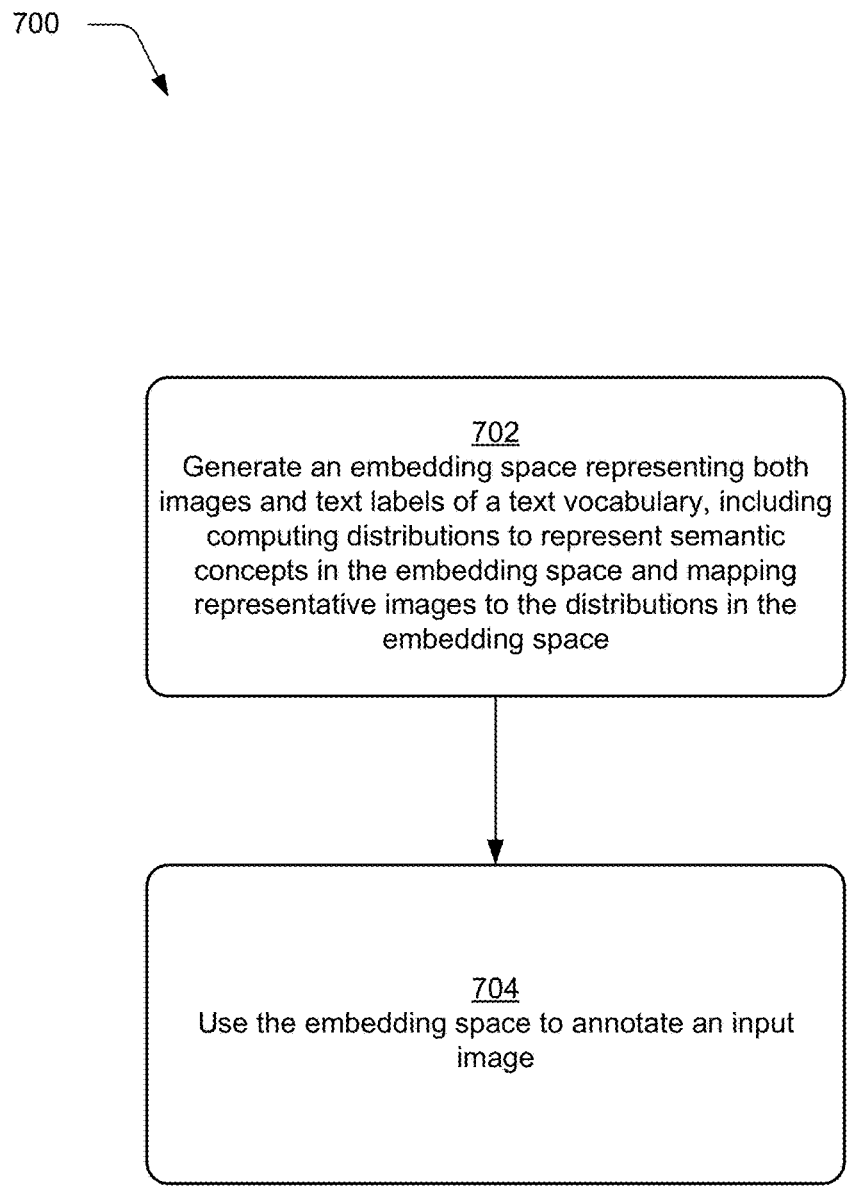
FIG. 7 is a flow diagram depicting a procedure in another example implementation in which an embedding space is generated to model semantic concepts described by text labels as distributions in the embedding space.

FIG. 7 depicts an example procedure 700 in which an embedding space is generated to represent semantic concepts in an embedding space as distributions. An embedding space representing both images and text labels of a text vocabulary is generated (block 702). As part of generating the embedding space, distributions are computed to represent semantic concepts. The semantic concepts for which the distributions are generated are described by respective text labels of a text vocabulary and are capable of being depicted in image content. Additionally, representative images are mapped to the distributions of the embedding space as part of the generating. The representative images mapped as part of the generating depict image content that exemplifies the corresponding semantic concepts of the distributions.

By way of example, the MIE module 114 generates the joint-image text embedding space 402 by computing distributions (e.g., Gaussian distributions, Gaussian mixtures, and so on) to represent semantic concepts that are described by text labels from a text vocabulary. The MIE module 114 generates the joint-image text embedding space 402 to enable image and text label embedding relative to the distributions that represent the semantic concepts. Further, the MIE module 114 trains the joint-image text embedding space 402 by embedding representative image regions, having image content which exemplifies the semantic concepts, with respective distributions formed for the semantic concepts.

The embedding space that represents the semantic concepts as distributions is used to annotate an image (block 704). By way of example, the MIE module 114 uses the joint-image text embedding space 402 to annotate the image 202 with text labels that describe the content of the image 202. For instance, the MIE module 114 uses the joint-image text embedding space 402 to discover the text labels 204, 206, 208, 210, 212, and then to annotate the image 202 with the discovered labels.

Having described example procedures in accordance with one or more implementations, consider now an example system and device that can be utilized to implement the various techniques described herein.

Example System and Device

Figure 8:
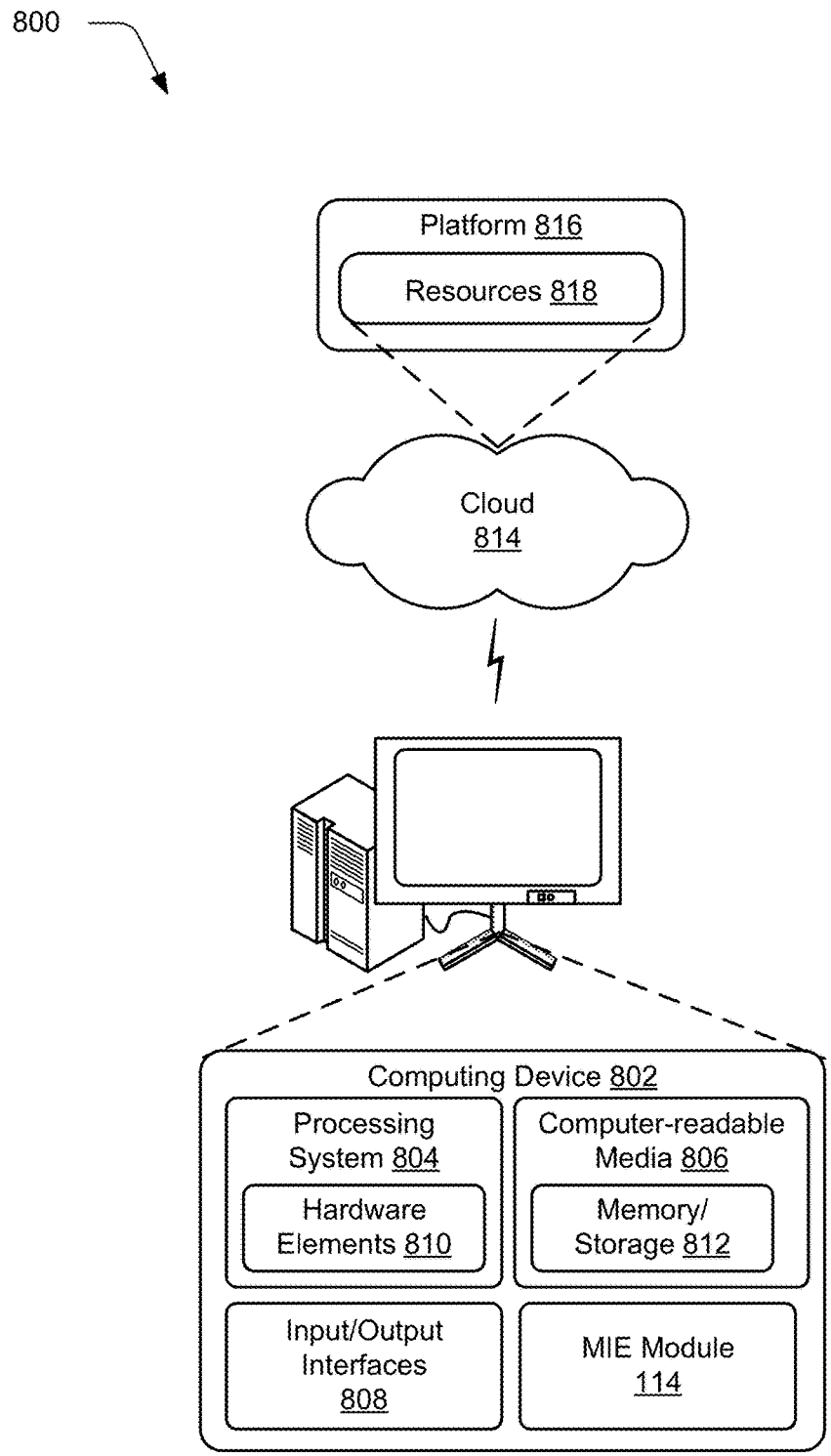
FIG. 8 illustrates an example system including various components of an example device that can be employed for one or more implementations of techniques for modeling semantic concepts in an embedding space as distributions are described herein.

FIG. 8 illustrates an example system generally at 800 that includes an example computing device 802 that is representative of one or more computing systems and/or devices that implement the various techniques described herein. This is illustrated through inclusion of the MIE module 114, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software are achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributed throughout the system 800. For example, the functionality is implemented in part on the computing device 802 as well as via the platform 816 that abstracts the functionality of the cloud 814.

CONCLUSION mini Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to annotate images with determined text labels to describe content of the images, the method comprising:
   generating an embedding space representing both images and text labels of a text vocabulary, including:
      computing distributions representing semantic concepts in the embedding space rather than representing the semantic concepts as single points, the semantic concepts for which the distributions are computed being described by respective text labels of the text vocabulary and capable of being depicted in image content;

determining semantic relationships between meanings of the text labels of the text vocabulary;

positioning the distributions in the embedding space based on the semantic relationships determined for the respective text labels; and mapping representative images to the distributions of the embedding space, wherein the image content depicted by the representative images exemplifies corresponding semantic concepts of the distributions;

determining a set of semantically meaningful image regions of a query image, the set of semantically meaningful image regions of the query image being mappable to the text labels in the embedding space;

processing the set of semantically meaningful image regions of the query image to discard semantically meaningful image regions of the query image that fail to meet at least one predefined criterion and to obtain a subset of the semantically meaningful image regions of the query image that meet the at least one predefined criterion;

determining, using the embedding space, at least one of the text labels of the embedding space describing at least one depicted semantic concept in criteria-meeting image regions of the query image; and annotating the query image by associating the determined text labels with the query image.

2. A method as described in claim 1, wherein the distributions are computed as Gaussian distributions representing the semantic concepts.

3. A method as described in claim 1, wherein the distributions are computed as Gaussian mixtures representing the semantic concepts.

4. A method as described in claim 1, wherein generating the embedding space further includes:

processing a plurality of training images, each training image having multiple text labels, said processing including generating sets of image regions that correspond to respective labels of the multiple text labels; and setting the sets of image regions as the representative images for the mapping to the distributions of the embedding space.

5. A method as described in claim 4, wherein processing the plurality of training images includes, for each training image:

determining candidate image regions for a respective set of image regions of the training image; and reducing a number of the determined candidate image regions using at least one post-processing technique.

6. A method as described in claim 5, wherein the candidate image regions are determined using geodesic object proposal.

7. A method as described in claim 5, wherein the at least one post-processing technique involves enforcing a size criterion by discarding candidate image regions having less than a threshold size.

8. A method as described in claim 5, wherein the at least one post-processing technique involves enforcing an aspect ratio criterion by discarding candidate image regions having aspect ratios outside predefined allowable aspect ratios.

9. A method as described in claim 5, wherein the at least one post-processing technique includes assigning a single candidate image region to each respective label of the multiple text labels of the training image based on a single-label embedding model.

10. A method as described in claim 1, wherein determining the at least one text label includes computing distances in the embedding space between embeddings of the semantically meaningful image regions of the query image and the distributions.

11. A method as described in claim 10, wherein the distances are computed using vectors that represent respective semantically meaningful image regions of the query image, the vectors extracted from the semantically meaningful image regions of the query image with a Convolutional Neural Network (CNN).

12. A method as described in claim 10, further comprising selecting the at least one text label for association with the query image based on the distances.

13. A method as described in claim 1, further comprising presenting indications of the criteria-meeting image regions of the query image that correspond to the at least one text label.

14. A method as described in claim 1, wherein the query image is annotated in conjunction with indexing the query image for search.

15. A method as described in claim 1, further comprising presenting the criteria-meeting image regions of the query image, the presented criteria-meeting image regions of the query image changed visually to appear different from other portions of the query image.

16. A system to annotate images with determined text labels to describe content of the image, the system comprising:

one or more processors; and computer-readable storage media having stored thereon instructions that are executable by the one or more processors to perform operations comprising:

processing a training image having multiple text labels, said processing including generating a set of image regions that correspond to respective labels of the multiple text labels;

embedding the set of image regions within an embedding space representing semantic concepts as distributions rather than representing the semantic concepts as single points, the semantic concepts represented being described by text labels of a text vocabulary and capable of being depicted in image content, the set of image regions embedded with distributions representing the semantic concepts depicted in the image content of the set of image regions, the distributions in the embedding space positioned based on semantic relationships determined for the text labels, and determination of the semantic relationships being based on meanings of the text labels of the text vocabulary;

determining a set of semantically meaningful image regions of a query image, the set of semantically meaningful image regions of the query image being mappable to the text labels in the embedding space;

processing the set of semantically meaningful image regions of the query image to discard the semantically meaningful image regions of the query image that fail to meet at least one predefined criterion and to obtain a subset of semantically meaningful image regions of the query image that meet the at least one predefined criterion;

determining the text labels that describe depicted semantic concepts of the query image by mapping criteria-meeting image regions of the query image to the distributions of the embedding space; and annotating the query image with at least two of the determined text labels.

17. A system as described in claim 16, further comprising presenting the image regions of the query image that correspond to the at least two determined text labels.

18. A system as described in claim 16, wherein the query image is annotated in conjunction with indexing the query image for search.

19. One or more computer-readable storage media comprising instructions stored thereon that, responsive to execution by a computing device, perform operations comprising:

generating an embedding space representing both images and text labels of a text vocabulary, including:

computing distributions representing semantic concepts in the embedding space rather than representing the semantic concepts as single points, the semantic concepts for which the distributions are computed being described by respective text labels of the text vocabulary and capable of being depicted in image content;

determining semantic relationships between meanings of the text labels of the text vocabulary;

positioning the distributions in the embedding space based on the semantic relationships determined for the respective text labels; and mapping representative images to the distributions of the embedding space, wherein the image content depicted by the representative images exemplifies corresponding semantic concepts of the distributions;

determining a set of semantically meaningful image regions of a query image, the set of semantically meaningful image regions of the query image being mappable to the text labels in the embedding space;

processing the set of semantically meaningful image regions of the query image to discard semantically meaningful image regions of the query image that fail to meet at least one predefined criterion and to obtain a subset of the semantically meaningful image regions of the query image that meet the at least one predefined criterion;

determining, using the embedding space, at least one of the text labels of the embedding space describing at least one depicted semantic concept in criteria-meeting image regions of the query image; and annotating the query image by associating the determined text labels with the query image.

20. One or more computer-readable storage media as described in claim 19, wherein the distributions are computed as Gaussian distributions representing the semantic concepts.

* * * * *